United States Patent
Suhama et al.

(10) Patent No.: US 8,866,435 B2
(45) Date of Patent: Oct. 21, 2014

(54) CONTROL DEVICE AND CONTROL METHOD FOR POWER CONTROL UNIT

(75) Inventors: Masayoshi Suhama, Toyota (JP); Kenji Yamada, Komaki (JP); Tetsuhiro Itoh, Nagoya (JP); Satoru Katoh, Nissin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 63 days.

(21) Appl. No.: 13/702,418

(22) PCT Filed: Jun. 7, 2010

(86) PCT No.: PCT/JP2010/059612
§ 371 (c)(1),
(2), (4) Date: Mar. 8, 2013

(87) PCT Pub. No.: WO2011/155013
PCT Pub. Date: Dec. 15, 2011

(65) Prior Publication Data
US 2013/0169206 A1 Jul. 4, 2013

(51) Int. Cl.
*H02P 23/00* (2006.01)
*H02M 7/00* (2006.01)
*H02P 6/08* (2006.01)
*H02P 21/08* (2006.01)
*H02P 27/08* (2006.01)

(52) U.S. Cl.
CPC . *H02P 6/08* (2013.01); *H02M 7/00* (2013.01); *H02P 21/08* (2013.01); *H02P 27/085* (2013.01)
USPC ...... 318/807; 318/503; 318/607; 318/400.24; 318/400.09; 701/22; 363/41

(58) Field of Classification Search
USPC ................ 318/78, 110, 147, 400.02, 400.09, 318/400.12, 400.21, 400.24, 503, 599, 607, 318/798, 801, 805–812, 827; 363/26, 41, 363/21.1, 21.11, 8, 165, 39
See application file for complete search history.

(56) References Cited

U.S. PATENT DOCUMENTS 5,744,927 A * 4/1998 Hayashida ............... 318/599
2007/0279948 A1 * 12/2007 Shin et al. .............. 363/41

(Continued)

FOREIGN PATENT DOCUMENTS

CN 101622780 A 1/2010
DE 19501375 A1 8/1995

(Continued)

OTHER PUBLICATIONS

International Search Report for PCT/JP2010/059612 dated Sep. 7, 2010.

*Primary Examiner* — Kawing Chan
*Assistant Examiner* — Jorge L Carrasquillo
(74) *Attorney, Agent, or Firm* — Sughrue Mion, PLLC

(57) ABSTRACT

A control device controls an inverter controlling an output of a motor by PWM control. The control device calculates a reference frequency based on a torque and a rotation speed of the motor, calculates a random coefficient using two data tables, and calculates, as a random frequency, a value obtained by adding, to a reference frequency, a value obtained by multiplying a prescribed width by the random coefficient. The control device calculates control limit lines based on the rotation speed of the motor, and corrects the random frequency so as to fall within a range that is higher than the control limit line and lower than the control limit line. The control device generates a carrier signal having a random frequency as a carrier frequency.

8 Claims, 7 Drawing Sheets

(56) References Cited

U.S. PATENT DOCUMENTS

| | | | |
|---|---|---|---|
| 2008/0230035 A1* | 9/2008 | Inoue | 123/497 |
| 2010/0052583 A1* | 3/2010 | Takamatsu et al. | 318/400.09 |
| 2010/0185350 A1* | 7/2010 | Okamura et al. | 701/22 |
| 2013/0049666 A1 | 2/2013 | Osugi | |

FOREIGN PATENT DOCUMENTS

| | | | |
|---|---|---|---|
| EP | 1850465 A2 | | 10/2007 |
| EP | 2114005 A1 | | 11/2009 |
| JP | 61-203893 A | | 9/1986 |
| JP | 6-14557 A | | 1/1994 |
| JP | 06014557 A | * | 1/1994 |
| JP | 2002010668 A | * | 1/2002 |
| JP | 2006-174645 A | | 6/2006 |
| JP | 2006174645 A | * | 6/2006 |
| JP | 2008-228554 A | | 9/2008 |
| JP | 2010-57243 A | | 3/2010 |
| WO | 2011-148485 A1 | | 12/2011 |

* cited by examiner

CALCULATE INTEGRAL GAIN Kir IN
ACCORDANCE WITH RATIO OF fr TO fs
(Ki = Ki×(fr/fs))

CALCULATE VOLTAGE COMMAND
VALUE IN ACCORDANCE WITH fs

CONTROL DEVICE AND CONTROL METHOD FOR POWER CONTROL UNIT

CROSS REFERENCE TO RELATED APPLICATIONS

This application is a National Stage of International Application No. PCT/JP2010/059612 filed Jun. 7, 2010, the contents of which are incorporated herein by reference in their entirety.

TECHNICAL FIELD

The present invention relates to control for a power control unit, and more particularly to control of pulse width modulation (which will be hereinafter also referred to as "PWM") of the power control unit.

BACKGROUND ART

Conventionally, a system for controlling a motor for vehicle running using an inverter has been employed. In electrically powered vehicles such as an electric vehicle, a hybrid vehicle and a fuel-cell vehicle, an inverter is generally used to control the output torque of the motor for vehicle running. Representatively, the output torque of the motor is controlled by PWM control. In this PWM control, switching elements of the inverter are turned on and off based on voltage comparison between a carrier wave signal (carrier signal) and a voltage command, thereby causing the inverter to apply a pulse width modulation voltage to the motor.

Due to the switching operation during this PWM control, noise occurs in the inverter. Regarding this problem, for example, Japanese Patent Laying-Open No. 6-14557 (PTL 1) discloses a technique by which the frequency of a carrier signal is caused to fluctuate such that the power spectrum density of the fluctuations of this frequency from a prescribed frequency is an inverse function of the carrier frequency, and a carrier signal thereof is applied to a modulation circuit, to obtain a drive signal for an inverter. According to the configuration in PTL 1, it becomes possible to alleviate discomfort from the noise produced by the inverter and to reduce noise.

CITATION LIST

Patent Literature

PTL 1: Japanese Patent Laying-Open No. 6-14557
PTL 2: Japanese Patent Laying-Open No. 2006-174645

SUMMARY OF INVENTION

Technical Problem

However, the technique disclosed in PTL 1 may not be able to sufficiently achieve both of reduction of the noise occurring in the power control unit and reduction of the loss occurring in the motor. Furthermore, the controllability of the motor may be deteriorated due to fluctuations in the carrier frequency.

The present invention has been made in order to solve the above-described problems. An object of the present invention is to achieve both of reduction of noise occurring in the power control unit and reduction of loss occurring in the motor without deteriorating the controllability of the motor.

Solution to Problem

A control device according to the present invention controls a power control unit controlling electric power transmitted and received between a motor and a power supply. The power control unit includes at least one switching element and converts electric power by turning the switching element on and off. The control device includes a first control unit controlling the switching element to be turned on and off based on comparison between a carrier signal and a control command; and a second control unit controlling a frequency of the carrier signal. The second control unit sets a frequency range in accordance with an operation state of the motor, and causes the frequency of the carrier signal to fluctuate within the frequency range.

Preferably, the second control unit sets a lower limit value of a switching frequency of the switching element required for ensuring controllability of the motor based on a rotation speed of the motor. The frequency of the carrier signal falling within the frequency range is greater than the lower limit value.

Preferably, the second control unit sets the lower limit value at approximately zero in a region where the rotation speed of the motor is lower than a prescribed speed, and sets the lower limit value at a value that is greater as the rotation speed of the motor is higher in a region where the rotation speed of the motor exceeds the prescribed speed.

Preferably, in addition to setting of the lower limit value, the second control unit calculates a reference frequency in accordance with the rotation speed and a torque of the motor, and sets a reference range including the reference frequency. The frequency range is a range falling within the reference range and greater than the lower limit value.

Preferably, the control device further includes a command generation unit generating the control command by feedback control based on a deviation between an output of the power control unit and a control target. The command generation unit corrects a feedback coefficient used for the feedback control in accordance with frequency fluctuations of the carrier signal, and generates the control command by the feedback control performed using the feedback coefficient that has been corrected.

Preferably, the command generation unit corrects the feedback coefficient according to a ratio of a reference frequency in accordance with the rotation speed and a torque of the motor to the frequency of the carrier signal.

Preferably, the control device further includes a storage unit storing a plurality of pieces of array data each having a plurality of values arranged therein. The second control unit arbitrarily reads the values one by one from the plurality of pieces of array data, and uses a product of the values read from the plurality of pieces of array data, respectively, to cause the frequency of the carrier signal to fluctuate.

Preferably, the power control unit is an inverter converting electric power of the power supply into electric power by which the motor can be driven.

A control method according to another aspect of the present invention is a control method performed by a control device for a power control unit controlling electric power transmitted and received between a motor and a power supply. The power control unit includes at least one switching element and converts electric power by turning the switching element on and off. The control method includes the steps of: controlling the switching element to be turned on and off based on comparison between a carrier signal and a control command; and controlling a frequency of the carrier signal. The step of controlling the frequency includes the step of setting a frequency range in accordance with an operation state of the motor, and causing the frequency of the carrier signal to fluctuate within the frequency range.

Advantageous Effects of Invention

According to the present invention, it becomes possible to achieve both of reduction of noise in the power control unit and reduction of loss in the motor without deteriorating the controllability of the motor.

DESCRIPTION OF EMBODIMENTS

Figure 1:
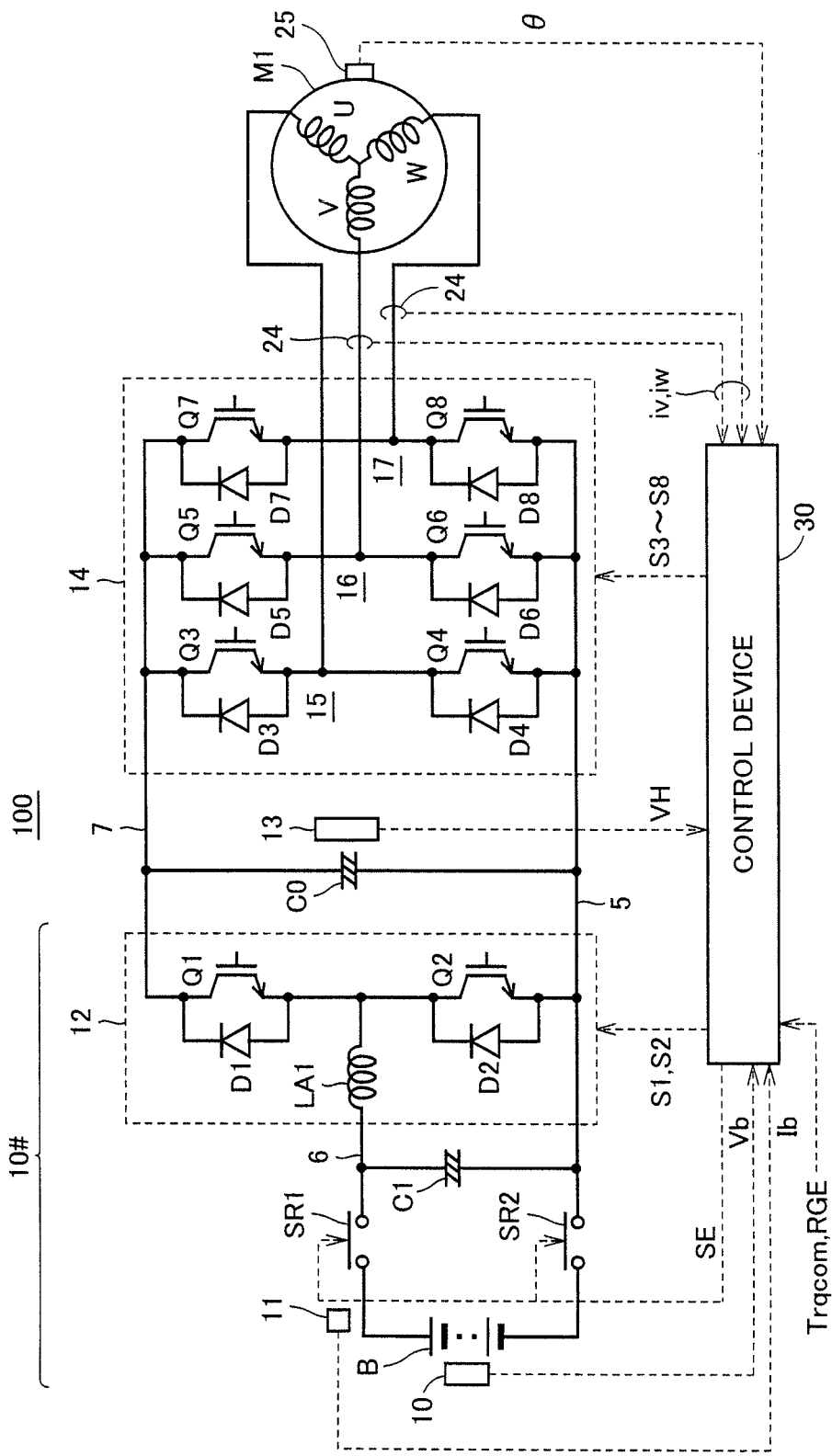
FIG. 1 is an entire configuration diagram of a motor drive control system.

The embodiments of the present invention will be hereinafter described in detail with reference to the drawings, in which the same or corresponding components are designated by the same reference characters, and description thereof will not be basically repeated.

FIG. 1 is an entire configuration diagram of a motor drive control system to which a control device for an inverter according to the embodiment of the present invention is applied. Although an explanation will be given in the present embodiment with regard to the case where an inverter is assumed as a target to be PWM-controlled by the control device, the target to be controlled in the present invention is not limited to an inverter, but may be applicable to a power control unit as a whole that can be controlled by PWM control (for example, a voltage converter).

Referring to FIG. 1, a motor drive control system 100 includes a direct-current (DC) voltage generation unit 10#, a smoothing capacitor C0, an inverter 14, a motor M1, and a control device 30.

Motor M1 is an alternating-current (AC) motor for generating torque for driving a driving wheel of an electrically powered vehicle (which is assumed as an automobile that produces a vehicle driving force with electrical energy, such as a hybrid vehicle, an electric vehicle and a fuel-cell vehicle). Representatively, motor M1 is a permanent-magnet type synchronous motor provided with three coils having three phases (U-, V-, W-phases), respectively. Motor M1 may be configured to have a function of a power generator.

DC voltage generation unit 10# includes a DC power supply B, system relays SR1 and SR2, a smoothing capacitor C1, and a converter 12.

DC power supply B is typically configured of a secondary battery such as a nickel-metal hydride battery or a lithium ion battery, and a power storage device such as an electric double layer capacitor. A DC voltage Vb output from DC power supply B and a DC current Ib input to/output from DC power supply B are detected by a voltage sensor 10 and a current sensor 11, respectively.

System relay SR1 is connected between the positive electrode terminal of DC power supply B and a power line 6 while system relay SR1 is connected between the negative electrode terminal of DC power supply B and a ground line 5. System relays SR1 and SR2 are turned on/off by a signal SE from control device 30.

Converter 12 includes a reactor LA1, switching elements Q1 and Q2, and diodes D1 and D2. Switching elements Q1 and Q2 are connected in series between a power line 7 and ground line 5. Reactor LA1 is connected between power line 6 and the connection node of switching elements Q1 and Q2. Furthermore, smoothing capacitor C0 is connected between power line 7 and ground line 5.

Converter 12 is basically controlled such that switching elements Q1 and Q2 are complementarily and alternately turned on and off within each switching cycle. At the time of the step-up operation, converter 12 raises DC voltage Vb output form DC power supply B to a DC voltage VH. At the time of the step-down operation, converter 12 lowers DC voltage VH to DC voltage Vb. Switching elements Q1 and Q2 are controlled to be turned on and off by switching control signals S1 and S2 from control device 30.

Smoothing capacitor C0 smoothes the DC voltage from converter 12, and supplies the smoothed DC voltage to inverter 14. Voltage sensor 13 detects the voltage across smoothing capacitor C0, that is, DC voltage VH and outputs the detection value to control device 30.

Inverter 14 is formed of an U-phase upper and lower arm 15, a V-phase upper and lower arm 16 and a W-phase upper and lower arm 17 which are provided in parallel between power line 7 and ground line 5. The upper and lower arm of each phase is formed of switching elements connected in series between power line 7 and ground line 5. For example, U-phase upper and lower arm 15 is formed of switching elements Q3 and Q4, V-phase upper and lower arm 16 is formed of switching elements Q5 and Q6, and W-phase upper and lower arm 17 is formed of switching elements Q7 and Q8. Furthermore, diodes D3 to D8 are connected in anti-parallel to switching elements Q3 to Q8, respectively. The other end of each phase coil of motor M1 is connected to the intermediate point of the switching elements of each of their respective phase upper and lower arms 15 to 17. Switching elements Q3 to Q8 are controlled to be turned on and off by switching control signals S3 to S8 from control device 30.

In the case where a torque command value Trqcom of motor M1 is positive, when a DC voltage is supplied from smoothing capacitor C0, inverter 14 converts the DC voltage into an AC voltage by the switching operation of each of switching elements Q3 to Q8 in response to switching control signals S3 to S8 from control device 30, to drive motor M1 so as to output a positive torque. Furthermore, in the case where torque command value Trqcom is zero, inverter 14 converts the DC voltage into an AC voltage by the switching operation in response to switching control signals S3 to S8, to drive motor M1 so as to set the torque at zero. Consequently, motor M1 is driven so as to generate a zero torque or a positive torque specified by torque command value Trqcom.

Furthermore, at the time of regenerative braking of an electrically powered vehicle having motor drive control system 100 mounted therein, torque command value Trqcom is set to be negative (Trqcom <0). In this case, by the switching operation in response to switching control signals S3 to S8, inverter 14 converts the AC voltage generated by motor M1 into a DC voltage, and supplies the converted DC voltage to converter 12 through smoothing capacitor C0.

A current sensor 24 detects a current flowing through motor M1, and outputs the detected motor current to control device 30. In addition, since the sum of instantaneous values of three-phase currents iu, iv and iw is equal to zero, it is sufficient to dispose current sensor 24 so as to detect motor currents of two phases (for example, V-phase current iv and W-phase current iw) as shown in FIG. 1.

A rotation angle sensor (resolver) 25 detects a rotor rotation angle θ of motor M1, and transmits this detected rotation angle θ to control device 30. Control device 30 can calculate the rotation speed of motor M1 based on rotation angle 9.

Control device 30 is composed of an electronic control unit (ECU) incorporating a CPU (Central Processing Unit) and a memory that are not shown. Control device 30 performs a prescribed operation processing based on the information and the program stored in the memory, thereby controlling the operation of motor drive control system 100.

As a representative function, based on torque command value Trqcom and the detection results of each sensor, control device 30 controls the operation of each of converter 12 and inverter 14 such that motor M1 outputs a torque in accordance with torque command value Trqcom. In other words, control device 30 generates switching control signals S1 to S8 for controlling converter 12 and inverter 14 as described above, and outputs these signals to converter 12 and inverter 14.

At the time of the step-up operation of converter 12, control device 30 feedback-controls DC voltage VH, and generates switching control signals S1 and S2 such that DC voltage VH is equal to a voltage command value.

Furthermore, when control device 30 receives a signal RGE from an external ECU showing that the electrically powered vehicle is brought into a regenerative braking mode, it generates switching control signals S3 to S8 and outputs these signals to inverter 14 for converting the AC voltage generated by motor M1 into a DC voltage. In response to this, inverter 14 converts the AC voltage generated by motor M1 into a DC voltage, and supplies the converted DC voltage to converter 12.

Furthermore, when control device 30 receives signal RGE from the external ECU showing that the electrically powered vehicle is brought into a regenerative braking mode, control device 30 generates switching control signals S1 and S2 for lowering the DC voltage supplied from inverter 14, and outputs these signals to converter 12. In response to this, the AC voltage generated by motor M1 is converted into a DC voltage which is then lowered and supplied to DC power supply B.

Figure 2:
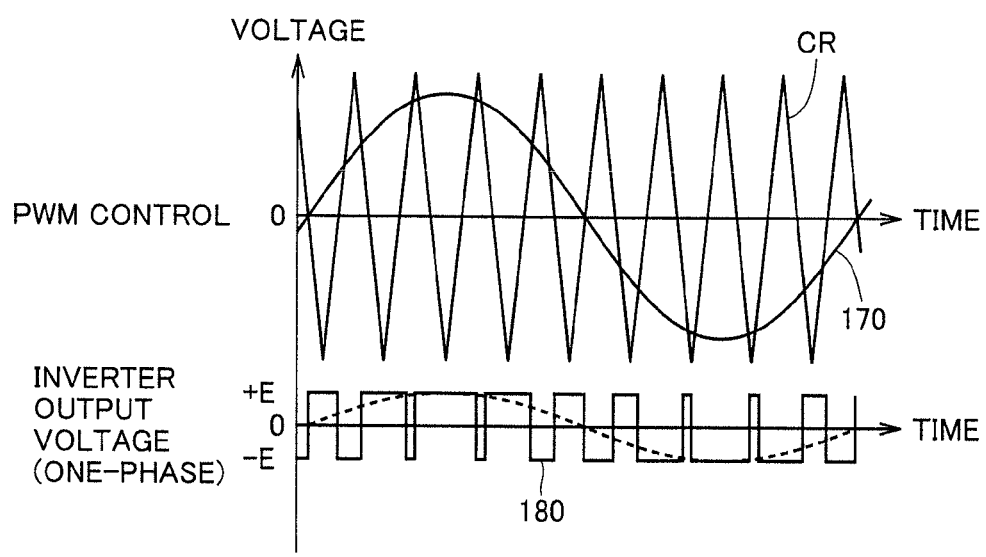
FIG. 2 is waveform diagrams of a carrier signal and a pulse width modulation voltage.

Then, referring to FIG. 2, PWM control for inverter 14 will be described. As shown in FIG. 2, in PWM control, based on the voltage comparison between a carrier signal CR and a phase voltage command 170, the switching elements of each phase of inverter 14 are controlled to be turned on and off, thereby causing a pulse width modulation voltage 180 as a quasi-sinusoidal voltage to be applied to each phase of motor M1. Accordingly, the number of times of switching operations of each switching element per unit time (which will be hereinafter also referred to as a "switching frequency") is dependent on the frequency of carrier signal CR (which will be hereinafter also referred to as a "carrier frequency f"). It is to be noted that carrier signal CR can be formed of a triangular wave or a saw-tooth wave. FIG. 2 shows a triangular wave.

Due to the switching operation during this PWM control, noise and losses (a switching loss) occur in inverter 14. When carrier frequency f (that is, a switching frequency) is relatively high, noise is relatively small but losses are relatively large. In contrast, when carrier frequency f is relatively low, losses are relatively small but noise is relatively large. From the viewpoint of energy efficiency, it is desirable to set carrier frequency f at a low value with which loss is reduced. This however causes a problem of increased noise.

In light of the above-described problems, control device 30 according to the present embodiment sets a range in accordance with the operation state of motor M1, and causes carrier frequency f to arbitrarily fluctuate (be distributed) within this range, thereby achieving both of loss reduction and noise reduction during PWM control without deteriorating the controllability of motor M1.

Figure 3:
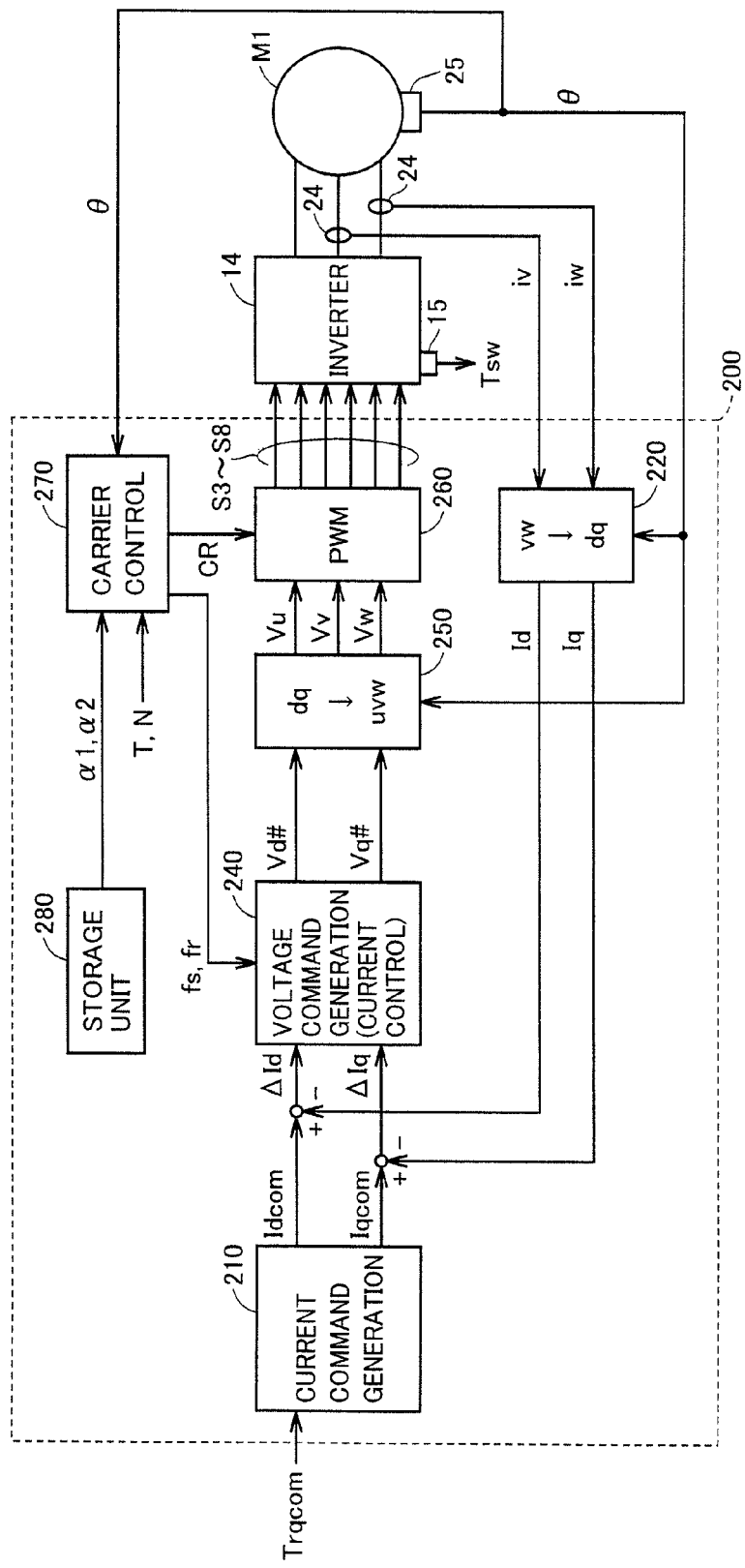
FIG. 3 is a functional block diagram of a control device.

FIG. 3 is a functional block diagram of a portion of control device 30 related to PWM control. Each functional block shown in FIG. 3 may be implemented by hardware processing by an electronic circuit and the like, or may be implemented by software processing by execution of a program and the like.

A PWM control unit 200 includes a current command generation unit 210, coordinate conversion units 220 and 250, a voltage command generation unit 240, a PWM modulation unit 280, a carrier control unit 270, and a storage unit 280.

Based on the map and the like prepared in advance, current command generation unit 210 generates a d-axis current target value Idreq and a q-axis current target value Iqreq in accordance with torque command value Trqcom.

By coordinate conversion using rotation angle θ of motor M1 detected by rotation angle sensor 25 (three-phase to two-phase), coordinate conversion unit 220 calculates a d-axis current Id and a q-axis current Iq based on v-phase current iv and W-phase current iw detected by current sensor 24.

A deviation ΔId between d-axis current target value Idreq and d-axis current Id (ΔId=Idreq−Id) and a deviation ΔIq between q-axis current target value Iqreq and q-axis current Iq (ΔIq=Iqreq−Iq) are input to voltage command generation unit 240.

For d-axis current deviation ΔId and q-axis current deviation ΔIq, voltage command generation unit 240 performs a PI (proportional integral) operation using a proportional gain Kp and an integral gain Ki to obtain a control deviation. In accordance with this control deviation, voltage command generation unit 240 generates a d-axis voltage command value Vd# and a q-axis voltage command value Vq#. Integral gain Ki is a feedback coefficient for adjusting the followability and the controllability of d-axis current Id to d-axis current target value Idreq, and the followability and the controllability of q-axis current Iq to q-axis current target value Iqreq. The greater the integral gain Ki is, the more the contribution of the integral action in PI control is increased. Accordingly, the control deviation can be reduced immediately. Voltage command generation unit 240 performs a process of correcting integral gain Ki in accordance with carrier frequency f. The process of correcting integral gain Ki will be described later.

By coordinate conversion (two-phase to three-phase) using rotation angle θ of motor M1, coordinate conversion unit 250 converts d-axis voltage command value Vd# and q-axis voltage command value Vq# into U-phase, V-phase and W-phase voltage commands Vu, Vv and Vw.

Carrier control unit 270 sets carrier frequency f, and generates carrier signal CR in accordance with the set carrier frequency f, to output this carrier signal CR to PWM modulation unit 260. In this case, carrier control unit 270 sets a range in accordance with the operation state of motor M1, and causes carrier frequency f to fluctuate (to be distributed) at random within this range. In the following description, random fluctuations of carrier frequency f will be also referred to as "random modulation".

Storage unit 280 stores two data tables (the first table and the second table) described later. The details of these two data tables will be described later.

Hereinafter described will be the method of setting carrier frequency f by carrier control unit 270.

First, carrier control unit 270 calculates a reference frequency fs based on a torque T and a rotation speed N of motor M1.

Figure 4:
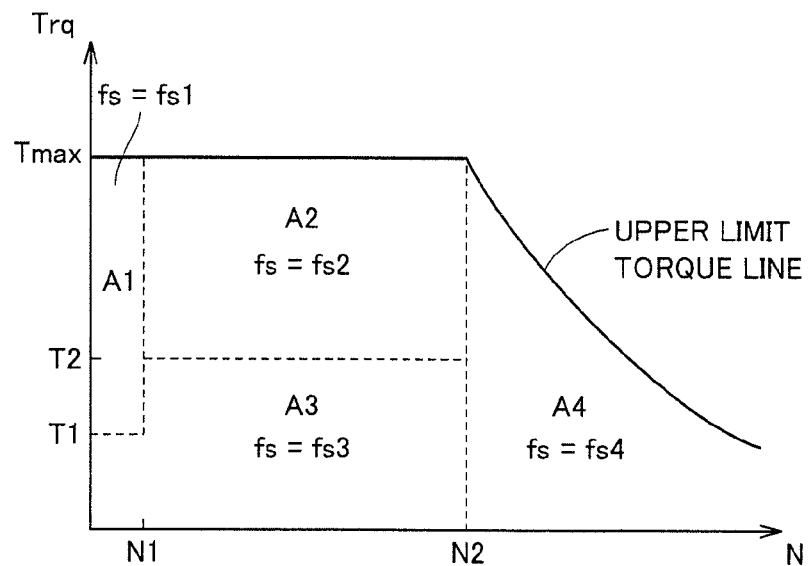
FIG. 4 is a map showing the relation of a reference frequency fs with a torque T and a rotation speed N of a motor.

FIG. 4 is a map showing the relation of reference frequency fs with torque T and rotation speed N of motor M1. Rotation speeds N1 and N2, torques T1 and T2, Tmax, and an upper limit torque line shown in FIG. 4 are set in advance by experiments and the like. In addition, the intersection point of torque T and rotation speed N of motor M1 (which will be hereinafter referred to as a "motor operation point") is controlled within the range that does not exceed the upper limit torque line.

Carrier control unit 270 changes reference frequency fs based on which region of four regions shown in FIG. 4 the motor operation point is included therein. These four regions shown in FIG. 4 specifically include a region A1 in which N<N1 and T>T1; a region A2 in which N1<N<N2 and T>T2; a region A3 obtained by combining a region in which 0<N<N1 and T<T1, and a region in which N1<N<N2 and T<T2; and a region A4 in which N<N2. Specifically, when the motor operation point is included in regions A1, A2, A3, and A4, carrier control unit 270 sets each reference frequency fs at prescribed values fs1, fs2, fs3, and fs4, respectively.

In addition, the number and each range of regions A1 to A4 and the number and each value of prescribed values fs1 to fs4 are set in advance in view of the controllability of motor M1, prevention of overheating of motor M1, and the like. In the present embodiment, prescribed values fs1 to fs4 are set so as to establish the relation of fs1<fs2<fs3<fs4. For example, prescribed values fs1, fs2, fs3, and fs4 may be set at approximately 0.75 kHz, 2.5 kHz, 3.75 kHz, and 5 kHz, respectively. Thus, in the present embodiment, reference frequency fs fluctuates within the range of a large region from the low frequency region of prescribed value fs1 (approximately 0.75 kHz) to the high frequency region of prescribed value fs4 (approximately 5 kHz).

Then, based on reference frequency fs, carrier control unit 270 calculates a random frequency fr used for random modulation.

Figure 5:
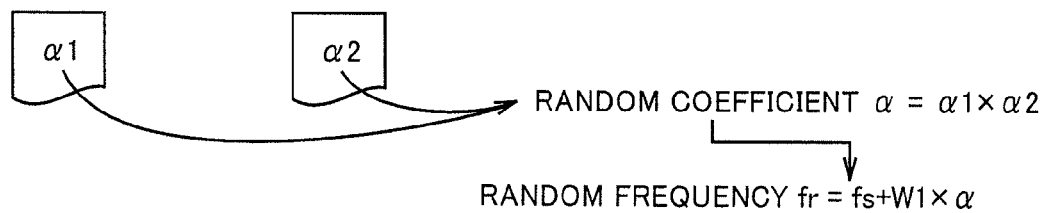
FIG. 5 is a diagram showing a method of calculating a random frequency fr.

FIG. 5 is a diagram illustrating the method of calculating random frequency fr. Two data tables (the first table and the second table) shown in FIG. 5 are stored in storage unit 280 in advance. A plurality of values including a coefficient $\alpha 1$ and a coefficient $\alpha 2$ are arranged in the first table and the second table, respectively. In each prescribed cycle, carrier control unit 270 reads the values of coefficient $\alpha 1$ and coefficient $\alpha 2$ at random from the first table and the second table, respectively, stored in the memory, and calculates a product of coefficient $\alpha 1$ and coefficient $\alpha 2$ as a random coefficient $\alpha$. In this way, while changing the combination of coefficient $\alpha 1$ and coefficient $\alpha 2$ by reference to arrays of two data tables, the value obtained by multiplying coefficient $\alpha 1$ by multiplied $\alpha 2$ is set as random coefficient $\alpha$. Consequently, a greater number of random coefficients $\alpha$ can be obtained with a relatively small number of pieces of data, as compared with the case where random coefficient $\alpha$ is stored in one data table. For example, as shown in FIG. 5, when 64 coefficients $\alpha 1$ and 64 coefficients $\alpha 2$ are arranged in the first table and the second table, respectively, 4096 (=64×64) types of random coefficients $\alpha$ can be calculated from a total data number of 128 (=64+64). Therefore, the numerical value pattern of random coefficient $\alpha$ can be set at a numerical value pattern of an extremely long period with a small memory capacity. It is to be noted that the number of data tables may be three or more.

The values of coefficient $\alpha 1$ and coefficient $\alpha 2$ arranged in the first table and the second table, respectively, are set in advance such that the difference between the minimum value and the maximum value of random coefficient $\alpha$ (a product of $\alpha 1$ and $\alpha 2$) is equal to "1" (for example, the minimum value of the product of $\alpha 1$ and $\alpha 2$ is equal to −0.5 while the maximum value thereof is equal to +0.5).

Then, carrier control unit 270 calculates, as random frequency fr, the value obtained by adding, to reference frequency fs, the value obtained by multiplying a prescribed width W1 by random coefficient $\alpha$. Thereby, random frequency fr can be caused to fluctuate at random with respect to reference frequency fs in the range between the upper limit frequency (the value obtained by adding, to reference frequency fs, the product of prescribed width W1 and the maximum value of random coefficient $\alpha$) and the lower limit frequency (the value obtained by adding, to reference frequency fs, the product of prescribed width W1 and the minimum value of random coefficient $\alpha$).

Figure 6:
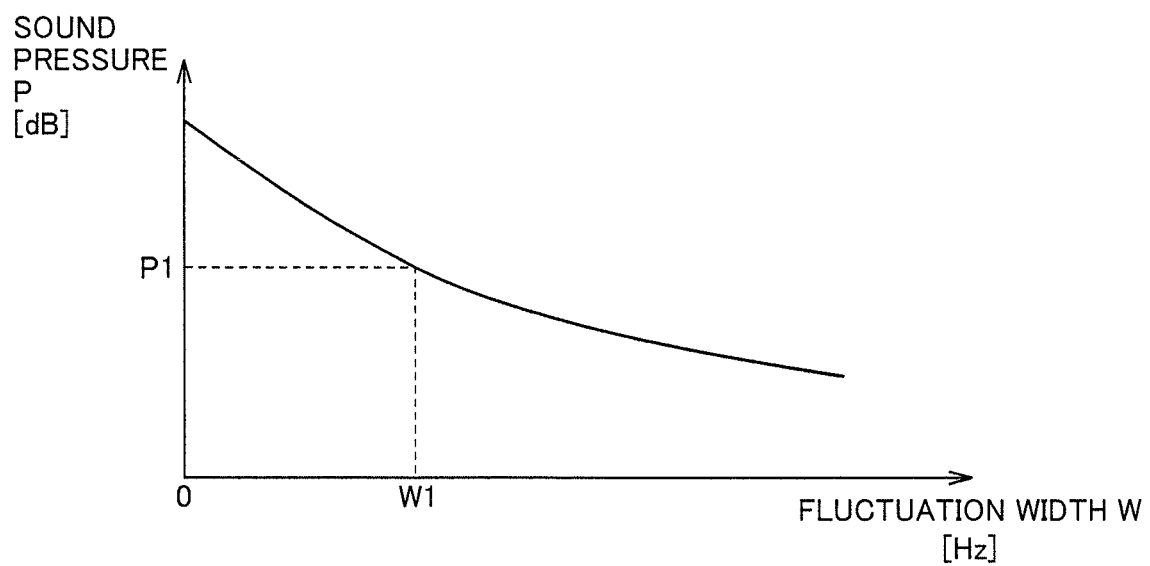
FIG. 6 is a diagram showing the relation between a fluctuation width W of random frequency fr and a sound pressure P of noise.

FIG. 6 is a diagram showing the relation between a fluctuation width W of random frequency fr and a sound pressure P of the noise caused in inverter 14. When fluctuation width W is "0" in FIG. 3, it means that carrier frequency f does not fluctuate and is fixed at reference frequency fs. As shown in FIG. 3, the greater the fluctuation width W is, the lower the sound pressure P is. Utilizing this relation, control device 30 causes distribution of a high frequency spectrum to prevent generation of a specific harmonic content, thereby implementing noise reduction. In other words, control device 30 causes carrier frequency f to fluctuate at random within prescribed width W1 with respect to reference frequency fs, to prevent generation of a specific harmonic content thereby lowering sound pressure P of noise to a prescribed pressure P1 that is lower than the sound pressure in the case where reference frequency fs is fixed. Carrier frequency f is caused to fluctuate at random in this way, so that noise can be reduced. Accordingly, it becomes possible to set carrier frequency f (reference frequency fs) to fall within a low frequency region in which a switching loss is reduced.

Then, carrier control unit 270 calculates control limit lines L1 and L2 based on rotation speed N of motor M1. In this case, control limit line L1 corresponds to a lower limit value of the switching frequency that is set in accordance with rotation speed N of motor M1 and required for ensuring the controllability of motor M1. Control limit line L2 corresponds to an upper limit value of the switching frequency that is set in accordance with rotation speed N of motor M1 and allows prevention of overheating by the switching operation of inverter 14. When random frequency fr is lower than control limit line L1 or higher than control limit line L2, carrier control unit 270 corrects random frequency fr at a value that falls within the range higher than control limit line L1 and lower than control limit line L2.

Figure 7:
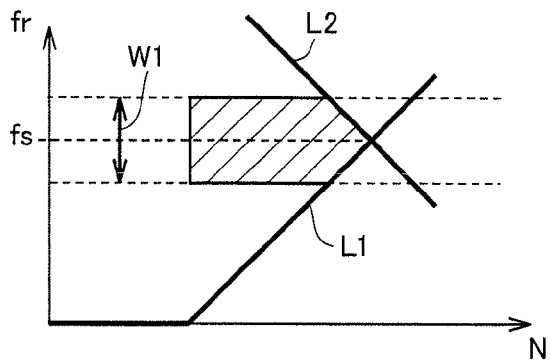
FIG. 7 is a diagram showing control limit lines L1, L2 and the range of random frequency fr after correction.

FIG. 7 is a diagram showing control limit lines L1, L2, and the range of random frequency fr after correction. In the region where rotation speed N is lower than a prescribed speed, control limit line L1 is set at zero, and in the region where rotation speed N exceeds a prescribed speed, control limit line L1 is set at a value that is greater as rotation speed N becomes higher. Furthermore, control limit line L2 is set at a value that is smaller as rotation speed N becomes higher.

Random frequency fr before correction is distributed within the range of prescribed width W1 between the upper limit frequency and the lower limit frequency with respect to reference frequency fs. In contrast, random frequency fr after correction is further adjusted so as to fall within the range that is higher than control limit line L1 and lower than control limit line L2 (the range in a diagonally shaded area in FIG. 7).

Referring back to FIG. 3, carrier control unit 270 generates carrier signal CR having a carrier frequency f set as random frequency fr after correction, and outputs the signal to PWM modulation unit 260.

PWM modulation unit 260 generates switching control signals S3 to S8 for inverter 14 in accordance with the voltage comparison between carrier signal CR and each of phase voltage commands Vu, Vv and Vw (corresponding to phase voltage command 170 in FIG. 2) from coordinate conversion unit 250. By controlling the upper and lower arm element of each phase of inverter 14 to be turned on and off in accordance with switching control signals S3 to S8, a quasi-sinusoidal voltage corresponding to pulse width modulation voltage 180 in FIG. 2 is applied to each phase of motor M1.

Furthermore, in response that carrier frequency f is set as random frequency fr, voltage command generation unit 240 calculates voltage command values Vd# and Vq# in accordance with random frequency fr. Specifically, voltage command generation unit 240 corrects the above-described integral gain Ki in accordance with random frequency fr.

Figure 8:
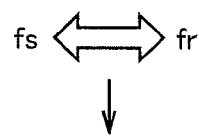
FIG. 8 is a diagram illustrating a method of correcting an integral gain Ki.
Figure 8:

FIG. 8 is a diagram showing the method of correcting integral gain Ki. Integral gain Ki before correction is set at a value in accordance with reference frequency fs. Accordingly, when carrier frequency f is set at random frequency fr, a gap occurs between reference frequency fs and random frequency fr, which may consequently deteriorate the followability and the controllability for feedback control (the followability and the controllability of currents Id and Iq to current target values Idreq and Iqreq). Thus, voltage command generation unit 240 calculates a ratio of random frequency fr to reference frequency fs (=fr/fs), and defines the product of this ratio and integral gain Ki before correction as an integral gain Ki after correction. This allows calculation of voltage command values Vd# and Vq# in accordance with random frequency fr, and therefore, it becomes possible to ensure the followability and the controllability for feedback control also at the time of random modulation control. For example, when random frequency fr is greater with respect to reference frequency fs, integral gain Ki is increased while contribution of I control (integral action) in PI control is increased, so that the control deviation can be reduced immediately.

Figure 9:
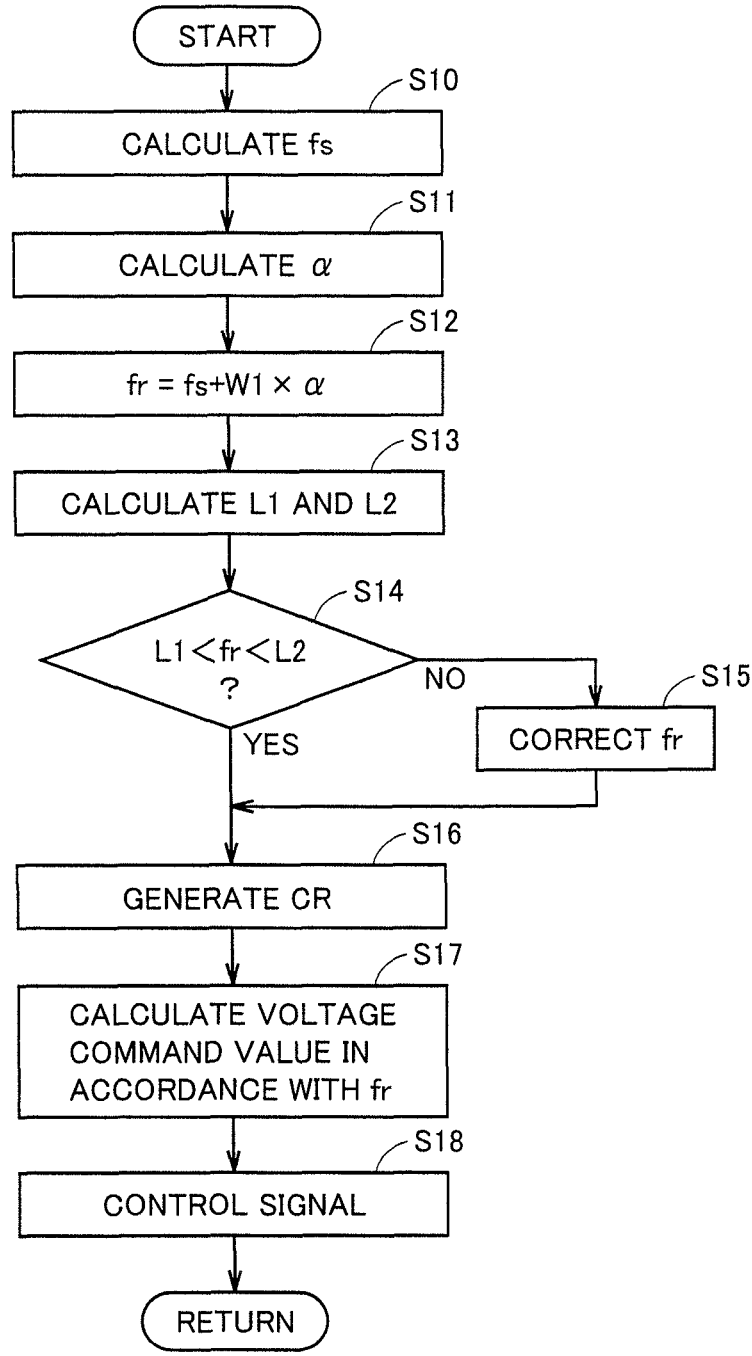
FIG. 9 is a flowchart illustrating the processing procedure of the control device.

FIG. 9 is a flowchart illustrating the processing procedure of control device 30 for implementing the function of random modulation in the above-described PWM control. Each step (which will be hereinafter abbreviated as "S") in the flowchart described below may be implement by hardware processing or software processing as described above.

In S10, control device 30 calculates reference frequency fs by the above-described method. In S11, control device 30 calculates random coefficient α by the above-described method.

In S12, control device 30 calculates, as random frequency fr, the value obtained by adding, to reference frequency fs, the value obtained by multiplying prescribed width W1 by random coefficient α.

In S13, control device 30 calculates the above-described control limit lines L1 and L2 based on rotation speed N of motor M1.

In S14, control device 30 determines whether or not random frequency fr falls within the range that is higher than control limit line L1 and lower than control limit line L2. When random frequency fr falls within the range that is higher than control limit line L1 and lower than control limit line L2 (YES in S14), the process proceeds to S16. If not (NO in S14), the process proceeds to S15.

In S15, control device 30 corrects random frequency fr such that random frequency fr falls within the range that is higher than control limit line L1 and lower than control limit line L2.

In S16, control device 30 generates carrier signal CR having random frequency fr as carrier frequency f.

In S17, control device 30 calculates voltage command values Vd# and Vq# in accordance with random frequency fr. In other words, as described above, control device 30 corrects integral gain Ki used for feedback control (PI control) of voltage command values Vd# and Vq# in accordance with the ratio of random frequency fr to reference frequency fs.

In S18, in accordance with the voltage comparison between carrier signal CR and each of phase voltage commands Vu, Vv and Vw obtained by converting voltage command values Vd# and Vq#, control device 30 generates switching control signals S3 to S8 for inverter 14, and outputs these signals to inverter 14.

As described above, control device 30 according to the present embodiment sets the frequency range in accordance with the operation state of motor M1 and causes carrier frequency f to fluctuate at random within this frequency range, thereby distributing a high frequency spectrum and preventing generation of a specific harmonic content, to implement noise reduction without deteriorating the controllability of motor M1. Accordingly, in the entire frequency region of carrier frequency f including a low frequency region that could not be used due to the noise problem, it becomes possible to implement both of loss reduction (improvement in energy efficiency) and noise reduction during PWM control without deteriorating the controllability of motor M1.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 5 ground line, 6, 7 power line, 10 voltage sensor, 10# DC voltage generation unit, 11, 24 current sensor, 12 converter, 13 voltage sensor, 14 inverter, 15, 16, 17 upper and lower arm, 25 rotation angle sensor, 30 control device, 100 motor drive control system, 170 voltage command, 180 pulse width modulation voltage, 200 PWM control unit, 210 current command generation unit, 220, 250 coordinate conversion unit, 240 voltage command generation unit, 260 PWM modulation unit, 270 carrier control unit, 280 storage unit, B DC power supply, C0, C1 smoothing capacitor, CR carrier signal, D1 to D8 diode, L1, L2 control limit line, LA1 reactor, M1 motor, Q1 to Q8 switching element, SR1, SR2 system relay.

The invention claimed is:

1. A control device for a power control unit controlling electric power transmitted and received between a motor and a power supply,
   said power control unit including at least one switching element and converting electric power by turning said switching element on and off,
   said control device comprising:
   a first control unit controlling said switching element to be turned on and off based on comparison between a carrier signal and a control command; and a second control unit controlling a frequency of said carrier signal, said second control unit setting a frequency range in accordance with a rotation speed of said motor, and causing the frequency of said carrier signal to fluctuate within said frequency range, and a lower limit value of said frequency range being set at a value that is greater as the rotation speed of said motor becomes higher;

wherein said lower limit value is set at zero in a region where the rotation speed of said motor is lower than a prescribed speed, and set at a value that is greater as the rotation speed of said motor is higher in a region where the rotation speed of said motor exceeds said prescribed speed.

2. The control device for a power control unit according to claim 1, wherein
said lower limit value is a switching frequency of said switching element required for ensuring controllability of said motor.

3. The control device for a power control unit according to claim 2, wherein
in addition to setting of said lower limit value, said second control unit calculates a reference frequency in accordance with the rotation speed and a torque of said motor, and sets a reference range including said reference frequency, and
said frequency range is a range falling within said reference range and greater than said lower limit value.

4. The control device for a power control unit according to claim 2, wherein
said control device further includes a command generation unit generating said control command by feedback control based on a deviation between an output of said power control unit and a control target, and
said command generation unit corrects a feedback coefficient used for said feedback control in accordance with frequency fluctuations of said carrier signal, and generates said control command by said feedback control performed using said feedback coefficient that has been corrected.

5. The control device for a power control unit according to claim 4, wherein said command generation unit corrects said feedback coefficient according to a ratio of a reference frequency in accordance with the rotation speed and a torque of said motor to the frequency of said carrier signal.

6. The control device for a power control unit according to claim 1, wherein
said control device further includes a storage unit storing a plurality of pieces of array data each having a plurality of values arranged therein, and
said second control unit arbitrarily reads said values one by one from said plurality of pieces of array data, and causes the frequency of said carrier signal to fluctuate based on a product of said values read from said plurality of pieces of array data, respectively.

7. The control device for a power control unit according to claim 1, wherein said power control unit is an inverter converting electric power of said power supply into electric power by which said motor can be driven.

8. A control method performed by a control device for a power control unit controlling electric power transmitted and received between a motor and a power supply,
said power control unit including at least one switching element and converting electric power by turning said switching element on and off, said control method comprising the steps of:
controlling said switching element to be turned on and off based on comparison between a carrier signal and a control command; and
controlling a frequency of said carrier signal,
said step of controlling the frequency including the step of setting a frequency range in accordance with a rotation speed of said motor, and causing the frequency of said carrier signal to fluctuate within said frequency range, and
a lower limit value of said frequency range being set at a value that is greater as the rotation speed of said motor becomes higher;
wherein said lower limit value is set at zero in a region where the rotation speed of said motor is lower than a prescribed speed, and set at a value that is greater as the rotation speed of said motor is higher in a region where the rotation speed of said motor exceeds said prescribed speed.

* * * * *